May 7, 1940.   H. KUDO   2,200,028
IMPACT TESTING MACHINE
Filed May 23, 1938   4 Sheets-Sheet 3
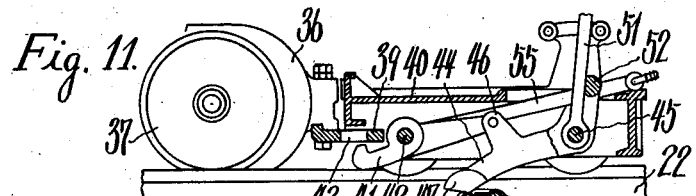
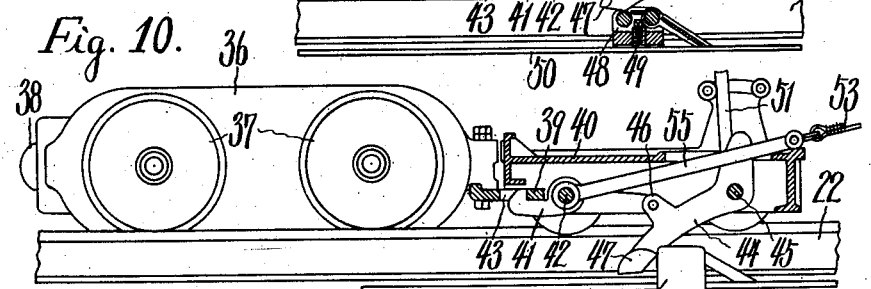
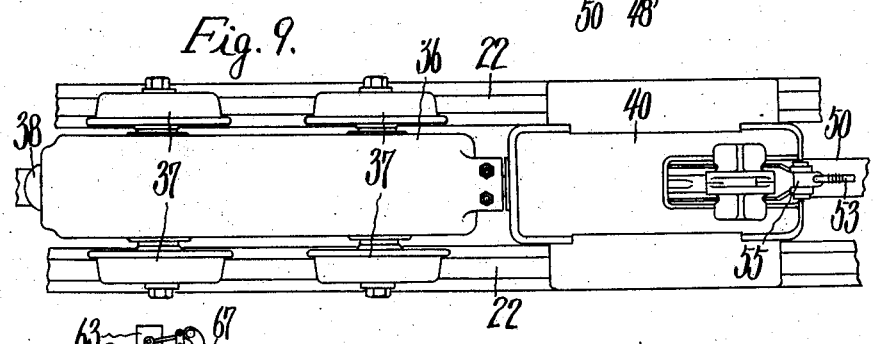
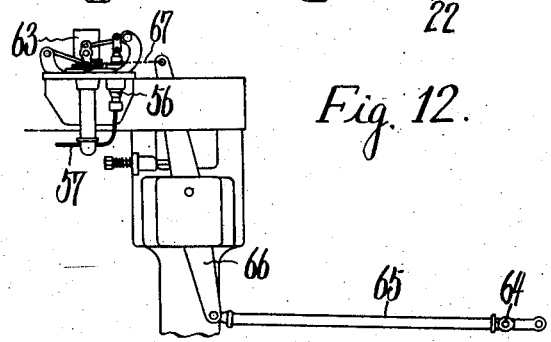
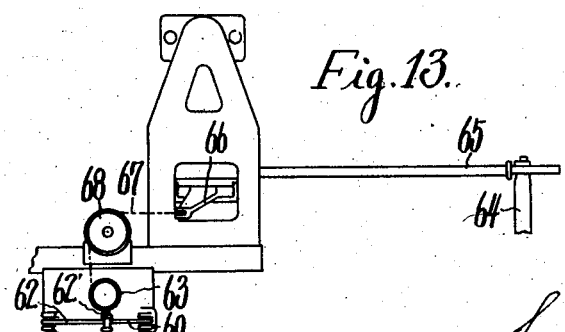
Inventor:
Hiojiro Kudo,
By *Spear, Donaldson & Hall* Attys.

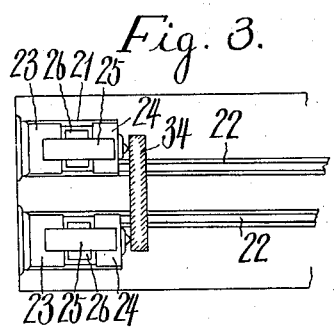
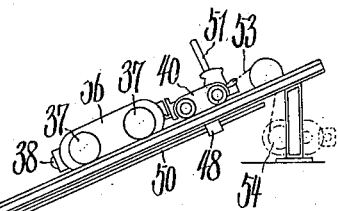
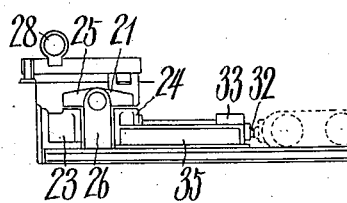
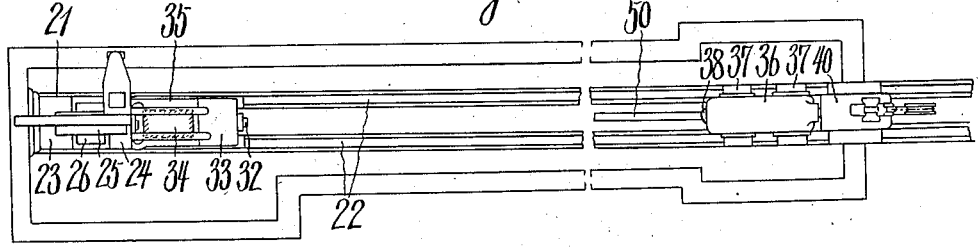
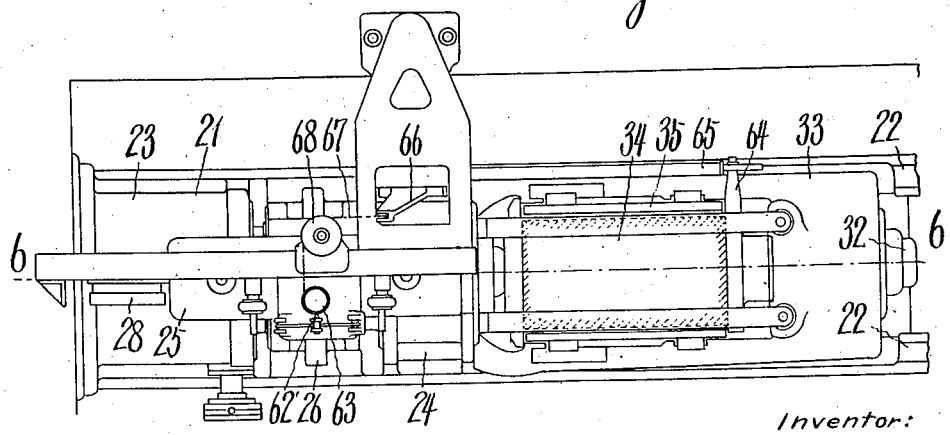

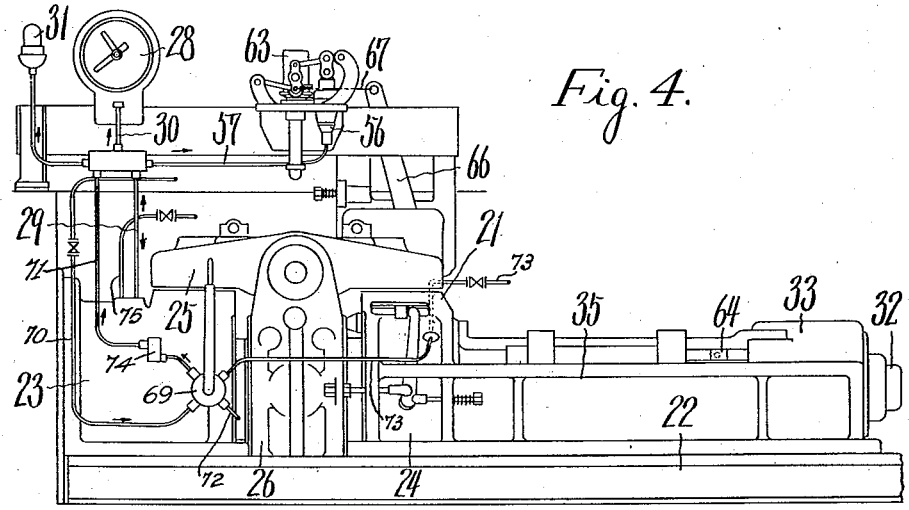
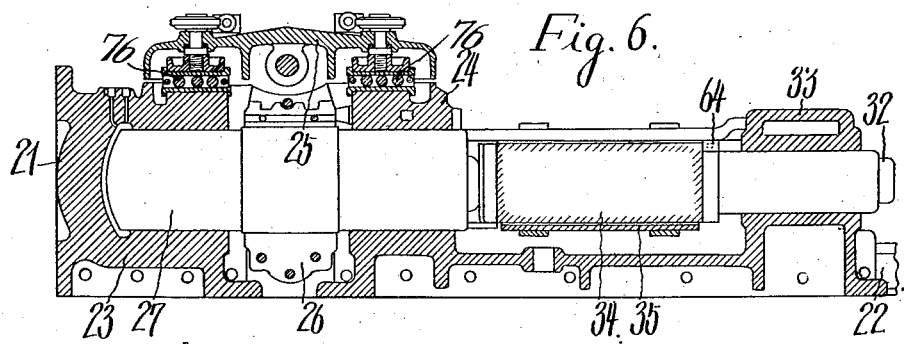
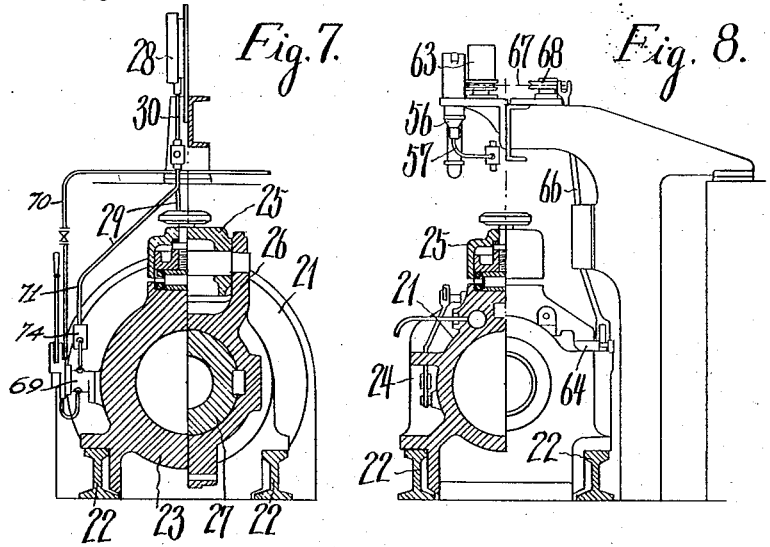

May 7, 1940.  H. KUDO  2,200,028
IMPACT TESTING MACHINE
Filed May 23, 1938   4 Sheets-Sheet 4

Inventor:
Hiojiro Kudo,
By Spear, Donaldson & Hall Attys.

Patented May 7, 1940

2,200,028

UNITED STATES PATENT OFFICE 2,200,028

IMPACT TESTING MACHINE

Hiojiro Kudo, Takahane, Nada-ku, Kobe, Japan, assignor to The Kobe Seikosho Company, Limited, Fukiai-ku, Kobe, Japan Application May 23, 1938, Serial No. 209,630

3 Claims. (Cl. 265—2)

My invention relates to an impact testing machine, especially for buffers or buffer beams for railway cars, rails, bridge beams and the like. The principal object of this invention is to provide means for facilitating the measurement of an impulsive force on them.

There was no proper impact testing machine to measure enormous impulsive forces on the said appliances or materials. Therefore it was not only very difficult to have reliance on their strength but also their weight became very great as excessive safety coefficients were taken due to uncertainty in their designs. My invention shall be able to remove such an uncertainty and also save their materials due to taking safety coefficients properly.

For the said object, a machine part, comprising a liquid packed cylinder with a plunger is fixed at the lower end of inclined rails, and a pressure gauge or an indicator is connected to the said cylinder. A weight with wheels is made to run down along the rails from a proper position to give an impact to a test body resting on the said machine part. The impulsive force is so transmitted from the test body to the plunger that the pressure is induced in the liquid by the plunger. The induced liquid pressure is measured by the pressure gauge or the indicator. The weight is lifted to a proper position on the inclined rails by a tractor which is operated by a lifting winch, and then it runs down along the rails according to its own weight to give an impact to a test body.

An embodiment of my invention is shown, by way of example, on the accompanying drawings, in which Figure 1 is a general side view of my invented impact testing machine.

Figure 2 is a plan view of the same.

Figure 3 is a part of a plan view of a modification of my invention.

Figure 4 is a side view of a machine part on larger scale.

Figure 5 is a plan view of the same.

Figure 6 is a sectional view along the line 6—6 of Fig. 5.

Figure 7 is a sectional view of the same, showing a left hand sectional view of a cylinder part and a right hand sectional view of a plunger hanger part respectively.

Figure 8 is an end view of the same, partly in section of a plunger guide part.

Figure 9 is a plan view of a weight and a tractor.

Figures 10 and 11 are side views of the same, partly in section.

Figure 12 is a side view of an indicator.

Figure 13 is a plan view of the same.

Figure 15:
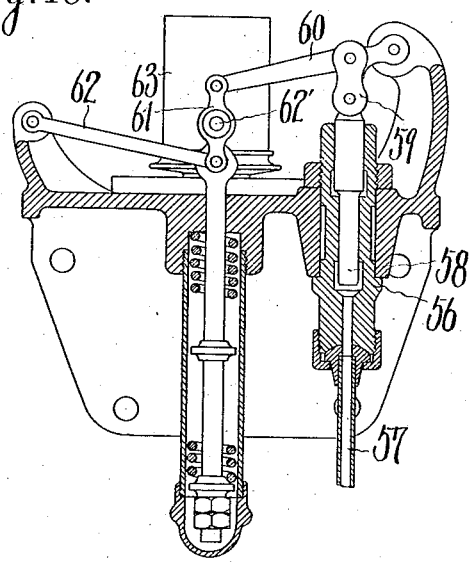
Figure 15 is a sectional view along the line 15—15 of Fig. 14.

Referring to Figures 1–8, the reference character 21 indicates a machine part, which is fixed at the lower end of inclined rails 22. A cylinder 23 is packed with liquid, for example, oil, and a plunger 27 is inserted and extends from the cylinder to a plunger guide 24. A plunger hanger 26 suspends the plunger from a beam 25, so that the plunger's friction, due to its own weight, is very small. The beam 25 is mounted on the cylinder and plunger guide on bearings indicated at 76 in Fig. 6. For some test bodies, such as a buffer for a railway car, a mono-cylinder type, as shown in Figure 2, is used, and for other test body such as a rail or a beam, a double-cylinder type, as shown in Figure 3, is used. I have illustrated in the following, means to make a test on a buffer for a railway car. The cylinder is provided with a pressure gauge 28, which is so connected therewith by pipes 29 and 30 that the liquid pressure is measured by the gauge, and also it is provided with a safety valve 31 to prevent it from explosion. Liquid, for example, oil, is fed to a main valve 69 (as shown in Fig. 4) by an oil inlet pipe 70, and then to the cylinder 21 by oil inlet pipes 71 and 29 from an oil pressure keeper (not shown), and the oil flows back to the oil pressure keeper by an oil eduction pipe 72. The oil in the cylinder may be discharged by an oil exhaust pipe 73. The pipe 71 is provided with a non-return valve 74, which prevents oil in the cylinder from flowing back into the main valve when the oil pressure in the cylinder increases. The cylinder is also provided with an air eduction pipe 75 to let air in it flow out when oil is fed. A rod 32 is held in a bearing 33 of the machine part, and a buffer 34 for a railway car is rested in a box 35 between the plunger and the rod in contact with each other.

Referring to Figures 9–11, 36 indicates a weight with wheels 37 which is provided with a striking head 38 and a coupling 39 at its front and rear ends respectively. The weight is coupled to a tractor 40 by putting a hook-shaped end of a coupling rod 41 mounted on a front axle 42 of the tractor into a coupling hole 43. A self-acting lever 44 is mounted on a rear axle 45 of the tractor, and its projection 46 is connected to the coupling rod. When the lower end 47 of the self-acting lever runs upon a tripping member 48, the coupling rod so rotates with the lever 44 that it disconnects from the coupling 39, and then the weight 36 runs down along the inclined rails, owing to the gravity acting upon it to strike against the rod 32. The above said tripping member is fixed by a set bolt 49 at a proper position on a beam 50 fixed between the inclined rails. The coupling rod is also operated by so turning a handle 51 mounted on the rear axle that a projection 52 of the self-acting lever is pushed by the handle.

A wire rope 53 of a lifting winch 54 is fastened at the rear end of a traction rod 55 mounted on the front axle to lift the weight along the inclined rails. Thus the weight is made to run down along the inclined rails from a proper position by means of the self-acting lever or the handle. The position from which the weight runs down is decided by a point where the tripping member is fixed.

The impulsive force given by the weight is transmitted to the fluid by means of the rod, the buffer and the plunger. The pressure is induced by the plunger action according to the magnitude of the impulsive force, and the fluid pressure is measured by the pressure gauge 28 or an indicator. The speed at the instant when the weight strikes against the rod is, of course, measured by an electric speedmeter; the description regarding the measurement is omitted here.

Figure 14:
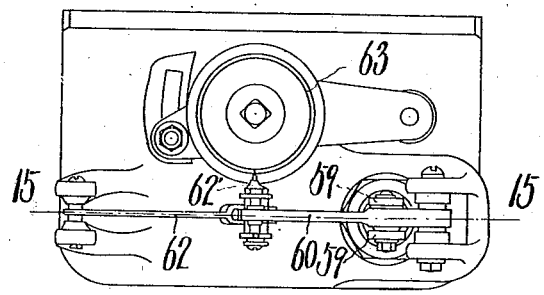
Figure 14 is a part of Figure 13 on larger scale.

Referring to Figures 12–16, 56 indicates an indicator cylinder which is so connected to the cylinder 23 by pipes 57 and 29 that a plunger 58 of the cylinder 56 has vertical movements according to the change of the fluid pressure of the cylinder 23, and also the plunger 58 rods 59, 60, 61 and 62 are so connected with each other that a recording tool 62' fixed at the center of the rod 61 has vertical movements according to that of the plunger 58. And also rods 32, 64, 65, 66 (Fig. 5) and a rope 67 of a pulley 68 are so connected with each other that the recording cylinder 63 rotates according to the buffer's compression. Thus, an impulsive force compression curve is described automatically on a paper wrapped around the recording cylinder 63.

The above indicator is very convenient for a test on a compressible body, such as a buffer, but it is not necessary for an incompressible body, such as a rail, a beam, or the like.

I claim:

1. An impact testing machine comprising a machine part including a liquid packed cylinder and a plunger disposed therein, with a pressure gauge or indicator connected to said cylinder, a plunger guide disposed adjacent to said cylinder to receive a portion of the plunger and to guide the same, and a plunger hanger for supporting said plunger so that the friction of the plunger due to its own weight is very small, said plunger being adapted to be engaged by a body to be tested by impact of a weight or the like, such as one having wheels and running upon rails to give an impact on the body to be tested, so that the liquid pressure induced by the impact is measured by the pressure gauge or indicator.

2. An impact testing machine according to claim 1 in which a box is provided for receiving the test body, said box being disposed next to the plunger guide so that the test body may contact the end of the plunger, and an impact rod disposed in a bearing to engage the opposite side or end of the test body.

3. An impact testing machine according to claim 1 in which said plunger hanger is disposed between the cylinder and the plunger guide and supports the plunger substantially centrally thereof.

HIOJIRO KUDO.